United States Patent
Song (10) Patent No.: US 8,943,749 B2
(45) Date of Patent: Feb. 3, 2015

(54) FLAP DOOR FOR VEHICLE

(71) Applicant: Hyundai Motor Company, Seoul (KR)

(72) Inventor: Ja Sang Song, Yongin-si (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 13/847,271

(22) Filed: Mar. 19, 2013

(65) Prior Publication Data

US 2014/0157674 A1 Jun. 12, 2014

(30) Foreign Application Priority Data

Dec. 11, 2012 (KR) ........................ 10-2012-0143655

(51) Int. Cl.
  *E05F 11/08* (2006.01)
(52) U.S. Cl.
  USPC ............... 49/344; 49/345; 49/339; 296/24.43
(58) Field of Classification Search
  USPC .................. 49/339, 340, 344, 345; 296/24.43, 296/146.8, 76
  See application file for complete search history.

(56) References Cited

U.S. PATENT DOCUMENTS

| | | | |
|---|---|---|---|
| 4,337,670 A * | 7/1982 | Carlson | 74/96 |
| 4,854,076 A * | 8/1989 | Sieben et al. | 49/280 |
| 6,766,616 B2 * | 7/2004 | Richter | 49/345 |
| 2001/0005920 A1 | 7/2001 | Kim | |

FOREIGN PATENT DOCUMENTS

| | | |
|---|---|---|
| JP | 09-301219 A | 11/1997 |
| KR | 20-0217988 | 3/2001 |
| KR | 2001-0064479 A | 7/2001 |
| KR | 20060002307 A | 1/2006 |
| KR | 20060020276 A | 3/2006 |
| KR | 10-2007-0025705 A | 3/2007 |

* cited by examiner

*Primary Examiner* — Gregory J. Strimbu
(74) *Attorney, Agent, or Firm* — McDermott Will & Emery LLP (57) ABSTRACT

A flap door includes a door body configured to be rotated around a longitudinal axis of a shaft by extension of a gas lift. A guide cam is fixed to a sidewall and has the shaft rotatably mounted to a center of the guide cam in a direction perpendicular to the sidewall, and a guide groove is formed in a side of the guide cam. A first arm has one end fixed to the shaft and another end extended toward the gas lift. A second arm has one end connected to the shaft so as to be rotatable around the shaft and another end connected to an end of the gas lift. A rotation transferring member transfers a rotational force from the second arm to the first arm as the rotation transferring member moves along a slot formed in the second arm and simultaneously moves along the guide groove according to rotation of the second arm.

5 Claims, 6 Drawing Sheets

FLAP DOOR FOR VEHICLE

CROSS-REFERENCE TO RELATED APPLICATION

This application is based on and claims benefit of priority to Korean Patent Application No. 10-2012-0143655, filed on Dec. 11, 2012 in the Korean Intellectual Property Office, the entire contents of which are hereby incorporated by reference.

TECHNICAL FIELD

The present inventive concept relates to a flap door for a vehicle, and more particularly, to a flap door for a vehicle capable of being smoothly opened and closed operation even with small force.

BACKGROUND

Generally, a flap door for a vehicle is a door apparatus provided in the vehicle so as to be openable and closable in order to put a cargo or a battery in the vehicle or check an engine. The flap door is usually opened and closed in a vertical direction by rotation. To this end, the flap door is connected to a vehicle body through a link structure.

Figure 1:
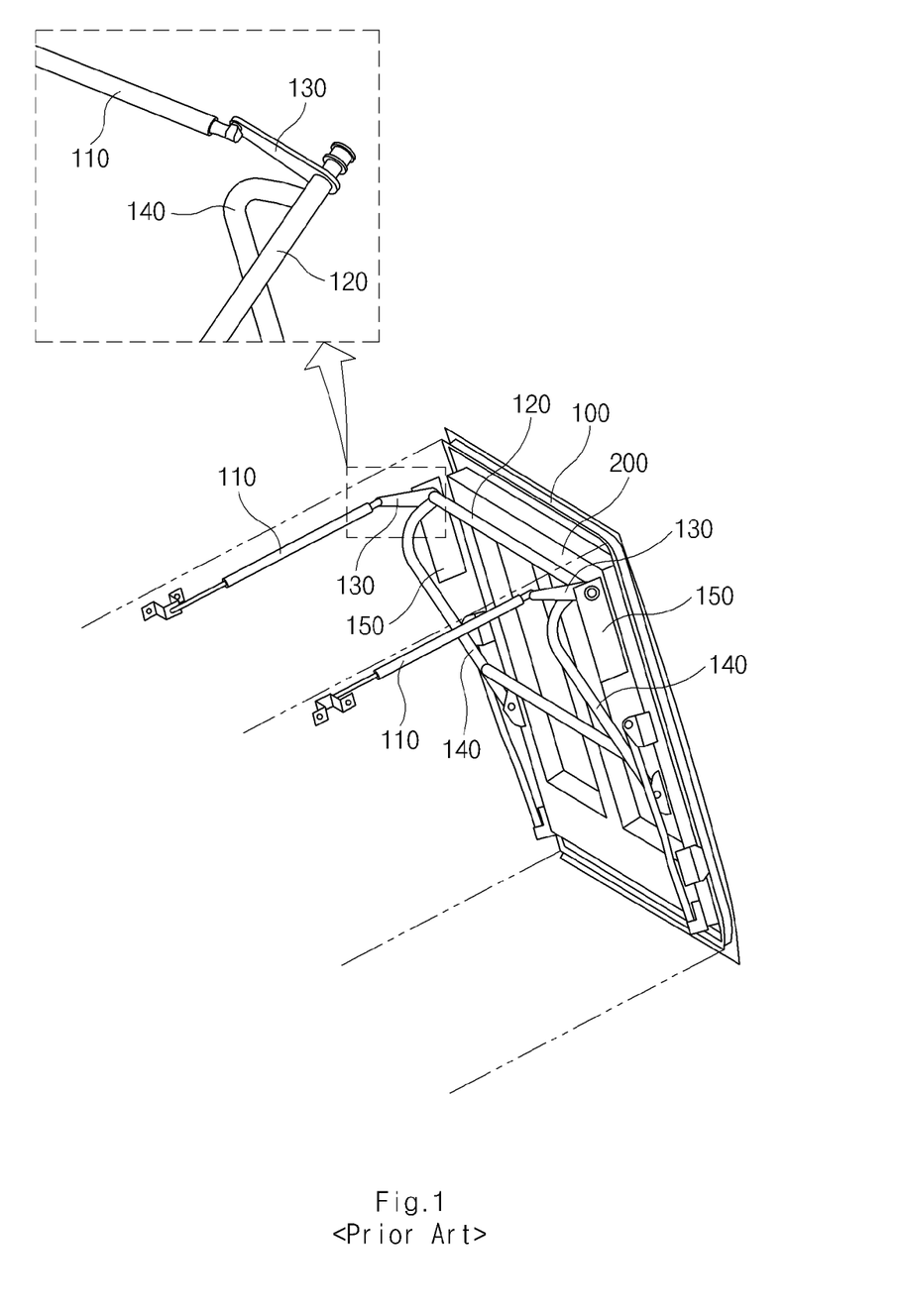
FIG. 1 is a view showing a flap door for a vehicle according to the related art.
Figure 2A:
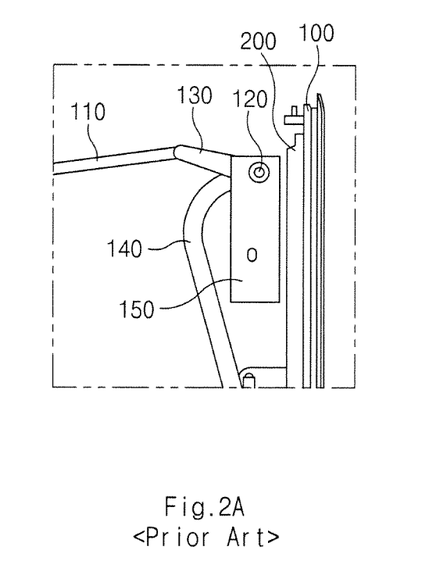
FIG. 2A is a view showing a part of a prior art flap door for a vehicle in a state of being closed.
Figure 2B:
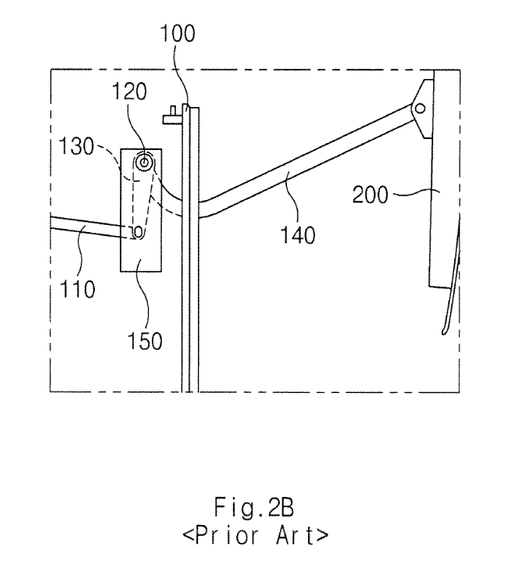
FIG. 2B is a view showing a part of the prior art flap door for a vehicle in a state of being half opened.
Figure 2C:
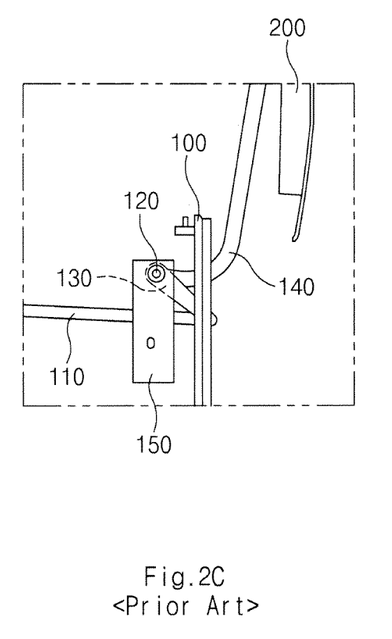
FIG. 2C is a view showing a part of the prior art flap door for a vehicle in a state of being completely opened.

FIG. 1 is a view showing a flap door for a vehicle according to the related art; and FIGS. 2A to 2C are views showing an operation of the flap door for a vehicle according to the related art. Referring to FIG. 1, a door body 200 opens and closes an aperture frame 100 of a space (represented by dot-dashed lines in FIG. 1) in which a cargo is stored. To this end, the flap door has a gas lift 110 having one end fixed to both side walls forming the above-mentioned space and the other end directed toward the door body 200 and extendable in a length direction, and has a link structure vertically rotating the door body 200 by an extension operation of the gas lift 110 in the length direction.

The link structure includes a shaft 120 rotatably installed at a fixed bracket 150 fixed to upper portions of both side walls, an arm link 130 having one end fixed to the shaft 120 and the other end rotatably connected to the gas lift 110, and a rotation link 140 having one end fixed to the shaft 120 and the other end fixed to a lower portion of the door body 200.

In the flap door for a vehicle according to the related art, as shown in FIGS. 2A to 2C, the arm link 130 and the shaft 120 are rotated by force transferred by the extension of the gas lift 110 in the length direction, such that the door body 200 is rotated to perform an opening operation or a closing operation. In the flap door for a vehicle according to the related art as described above, since the arm link 130 has a predetermined length and has the force applied to an end portion thereof (an acting point of the gas lift 110) through the gas lift 110, the length between the shaft 120 and the acting point of the gas lift 110 (a connection point between the gas lift 110 and the arm link 130) is not changed at the time of a rotation operation of the door body 200.

In the flap door for a vehicle according to the related art having the above-mentioned configuration, as a result of comparing a moment acting on the arm link 130 when starting an opening operation of the door body 200 in a state in which the door body 200 is closed as shown in FIG. 2A, a moment acting on the arm link 130 during the opening operation or a closing operation of the door body 200 as shown in FIG. 2B, and a moment acting on the arm link 130 when starting the closing operation of the door body 200 in a state in which the door body 200 is opened as shown in FIG. 2C, it has been confirmed that the moment when starting the opening operation of the door body 200 and the moment when starting the closing operation of the door body 200 are larger than the moment during the opening operation or the closing operation. Therefore, the flap door for a vehicle according to the related art has a problem that a user should apply large force to the door body 200 in order to open the door body 200 in the state shown in FIG. 2A or close the door body 200 in the state shown in FIG. 2C.

SUMMARY

Accordingly, the present inventive concept has been made to solve the above-mentioned problems occurring in the prior art while advantages achieved by the prior art are maintained intact.

An aspect of the present inventive concept relates to a flap door for a vehicle capable of decreasing required force in the case of opening or closing a door body.

An aspect of the present inventive concept encompasses a flap door for a vehicle including: a door body rotated based on a shaft by extension of a gas lift extendable in a length direction to open or close a predetermined space provided in a vehicle body; a guide cam fixedly installed to a sidewall, having the shaft rotatably installed at the center thereof in a direction perpendicular to the sidewall, and having a first guide groove formed in a side thereof; a first arm having one end fixed to the shaft and the other end extended toward the gas lift; a second arm having one end connected to the shaft so as to be rotatable around the shaft and the other end rotatably connected to the other end of the gas lift; and a rotation transferring member movably mounted in the first guide groove of the guide cam and transferring rotational force to the first arm while moving in a length direction of the second arm simultaneously with moving along the first guide groove according to rotation of the second arm.

BRIEF DESCRIPTION OF THE DRAWINGS

The foregoing and other features of the inventive concept will be apparent from more particular description of embodiments of the inventive concept, as illustrated in the accompanying drawings in which like reference characters may refer to the same or similar parts throughout the different views. The drawings are not necessarily to scale, emphasis instead being placed upon illustrating the principles of the embodiments of the inventive concept.

DETAILED DESCRIPTION OF THE PREFERRED EMBODIMENTS

Examples of the present inventive concept will be described below in more detail with reference to the accompanying drawings. The examples of the present inventive concept may, however, be embodied in different forms and should not be construed as limited to the examples set forth herein. Like reference numerals may refer to like elements throughout the specification.

Figure 3:
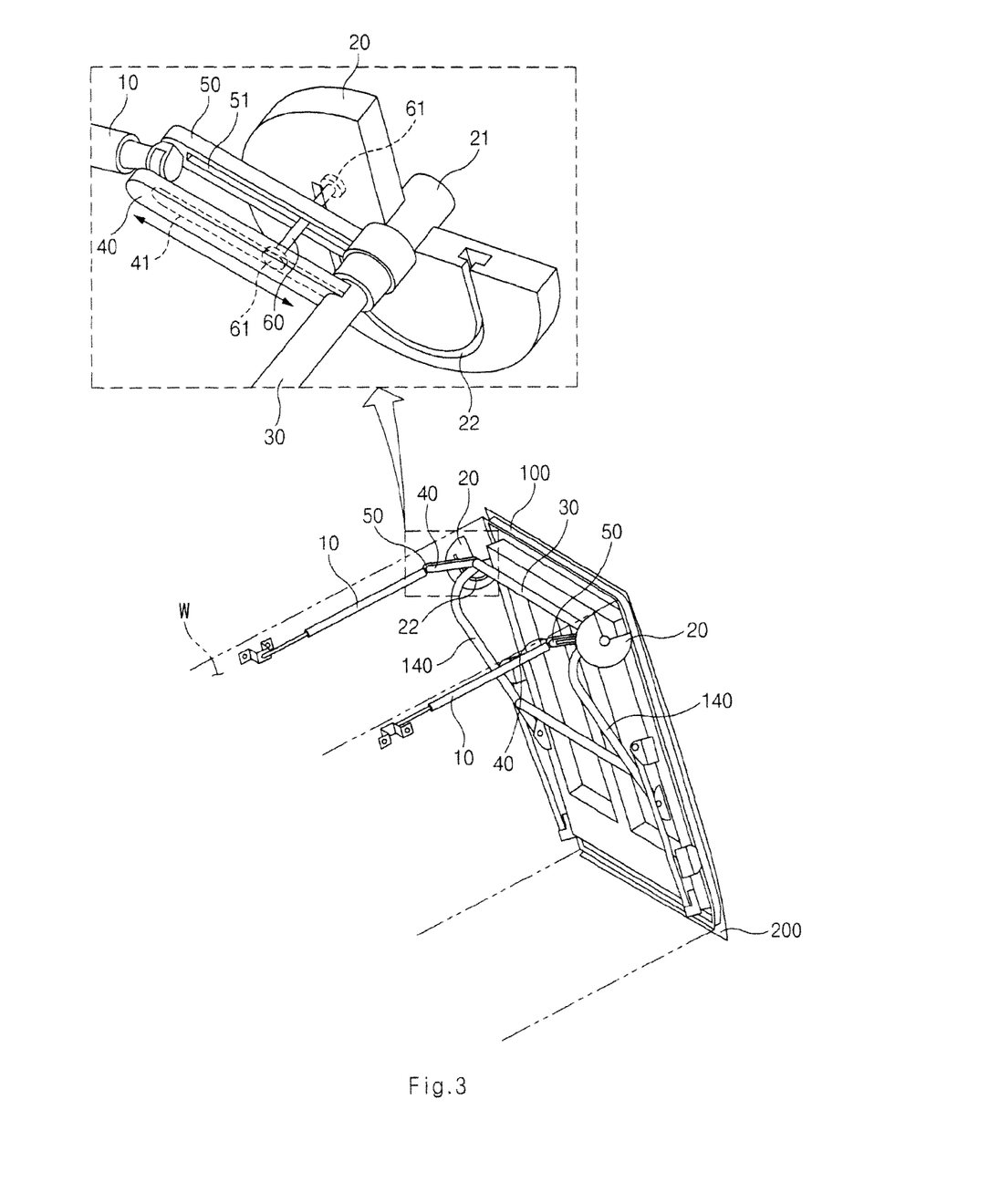
FIG. 3 is a view showing a flap door for a vehicle according to an exemplary embodiment of the present inventive concept.

Hereinafter, a flap door for a vehicle according to an exemplary embodiment of the present inventive concept will be described in detail with reference to the accompanying drawings. FIG. 3 is a view showing a flap door for a vehicle according to an exemplary embodiment of the present inventive concept. For convenience of explanation, components that are the same as those of a flap door for a vehicle according to the related art will be denoted by the same reference numerals.

Referring to FIG. 3, the flap door for a vehicle according to an embodiment of the present inventive concept includes an aperture frame 100 for opening a space provided in the vehicle to the outside as in the related art, whereby the aperture frame 100 is opened or closed by a door body 200.

The door body 200 is installed at a side wall W forming the space provided in the vehicle and has force applied thereto by a gas lift 10 extended in a length direction to thereby be rotated based on a shaft 30, such that the space is opened or closed.

The gas lift 10 has one end rotatably installed at the sidewall W through a bracket, or the like, and the other end extended toward the door body 200. The gas lift 10 is extendable in the length direction by gas present therein.

The shaft 30 is mounted such that both ends thereof are rotatable by guide cams 20 fixed to the sidewalls W. More specifically, the guide cams 20 have one surface fixed to the sidewall W and has a fixed shaft 21 formed at the center thereof and extended in a direction perpendicular to the sidewall W. Both ends of the shaft 30 are rotatably inserted into the fixed shafts 21 of the guide cams 20 fixed to both side walls W. Therefore, the shaft 30 has the center of an axis coinciding with the center of the fixed shaft 21 and is rotated based on the center of an axis thereof.

A side of the guide cams 20 opposite to the sidewall W is provided with a first guide groove 22. The first guide groove 22 has a 'U' shape based on the fixed shaft 21. More specifically, the first guide groove 22 has a shape in which portions positioned at both sides in a horizontal direction based on the fixed shaft 21 are closer to the center of the axis of the fixed shaft 21 as compared with a portion positioned under the fixed shaft 21.

In addition, the shaft 30 has a first arm 40 fixed thereto. More specifically, the first arm 40 has a configuration in which one end thereof is fixed to the shaft 30 and the other end thereof is extended toward the gas lift 10. However, the other end of the first arm 40 is not connected to the gas lift 10, but is separated from the gas lift 10. In addition, a surface of the first arm 40 facing the guide cams 20 is provided with a second guide groove 41 in the length direction (a direction extending from one end of the first arm 40 to the other end thereof). A rotation transferring member 60 to be described below is movably mounted in the second guide groove 41. Although the second guide groove 41 is formed in the surface of the first arm facing the guide cams 20 in an embodiment of the present inventive concept, the second guide groove 41 may also have a shape penetrating through both sides of the first arm 40 as long as the rotation transferring member 60 to be described below may be movably mounted therein.

Meanwhile, a second arm 50 is installed at the fixed shaft 21 of the guide cams 20 so as to be rotatable around the fixed shaft 21, between the guide cams 20 and the first arm 40. More specifically, the second arm 50 has a cylindrical shape. One end of the second arm 50 is inserted into an outer side of the fixed shaft 21 to be rotatable around the fixed shaft 21, and the other end of the second arm 50 is rotatably connected to one end of the gas lift 10 which extends toward the door body 200. The fixed shaft 21 is inserted into the inside of the cylindrical shape. Due to the above-mentioned configuration, the second arm 50 is rotated around the fixed shaft 21 of the guide cams 20 by a force in the length direction generated by the extension of the gas lift 10. In addition, the second arm 50 includes a slot 51 formed in the length direction (the direction extending from one end thereof to the other end thereof) at a central portion thereof connecting one end thereof and the other end thereof to each other.

Further, both ends of the rotation transferring member 60 are mounted in the first guide groove 22 of the guide cams 20 and the second guide groove 41 of the first arm 40 so as to be movable along the first guide groove 22 and the second guide groove 41, respectively. In addition, the rotation transferring member 60 is disposed across the slot 51 of the second arm 50 while having a central portion passing through the slot 51 of the second arm 50. That is, the rotation transferring member 60 is installed to be simultaneously movable with respect to the first guide groove 22 of the guide cams 20, the second guide groove 41 of the first arm 40, and the slot 51 of the second arm 50. In addition, both ends of the rotation transferring member 60 are installed with rollers 61. Since the rollers 61 installed at both ends of the rotation transferring member 60 roll-contact the first guide groove 22 of the guide cams 20 and the second guide groove 41 of the first arm 40, respectively, the rotation transferring member 60 may smoothly move along the first guide groove 22 of the guide cams 20 and the second guide groove 41 of the first arm 40 without friction.

Figure 4A:
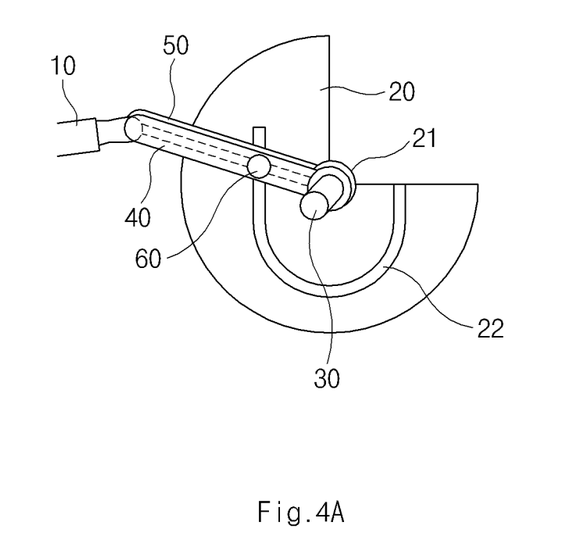
FIG. 4A is a view showing a part of the flap door for a vehicle in a state of being closed according to the exemplary embodiment of the present inventive concept.
Figure 4B:
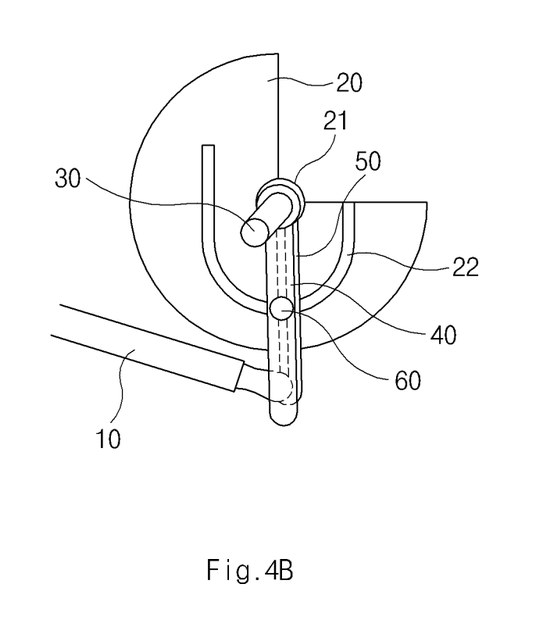
FIG. 4B is a view showing a part of the flap door for a vehicle in a state of being half opened according to the exemplary embodiment of the present inventive concept.
Figure 4C:
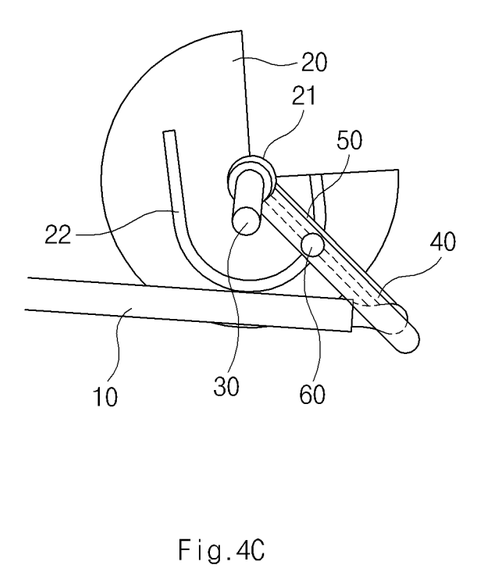
FIG. 4C is a view showing a part of the flap door for a vehicle in a state of being completely opened according to the exemplary embodiment of the present inventive concept.

Hereinafter, an operation of the flap door for a vehicle according to an embodiment of the present inventive concept having the above-mentioned configuration will be described. FIGS. 4A to 4C are views showing an operation of the flap door for a vehicle according to an embodiment of the present inventive concept. FIG. 4A is a view showing a state in which the door body 200 is closed. FIG. 4B is a view showing a state during an operation of opening or closing the door body 200. FIG. 4C is a view showing a state in which the door body 200 is opened.

When a user pulls the door body 200 to rotate the door body 200 in a counterclockwise direction in order to start an opening operation in the state in which the door body is closed as shown in FIG. 4A, the shaft 30 is rotated in the counterclockwise direction. Here, the distance between a position, at which the rotation transferring member 60 is locked in the first guide groove 22 of the guide cams 20, and the center of an axis of the shaft 30 is shorter than the length of the first arm 40 (the distance between the center of an axis of the shaft 30 and the gas lift 10). Therefore, in an embodiment of the present inventive concept, since a moment required to rotate the shaft 30 at the time of opening the door body 200 is smaller than a moment acting at a position distant by the length of the arm link 130 in the related art (which may be equivalent to the length of the first arm 40), the user may open the door body 200 with a smaller force.

Then, as shown in FIG. 4B, during a process of performing the opening and closing operation, the second arm 50 is rotated by the force generated by the extension operation of the gas lift 10 in the length direction. The rotation transferring member 60 disposed across the slot 51 of the second arm 50 is rotated together with the rotation of the second arm 50. In this case, when one end of the rotation transferring member 60 is locked in the first guide groove 22 of the guide cams 20, the rotation transferring member 60 is guided along a shape of the first guide groove 22. In addition, since the rotation transferring member 60 has the other end mounted in the second guide groove 41 of the first arm 40, the rotation transferring member 60 applies rotational force to the first arm 40 while one end thereof is guided along the shape of the first guide groove 22. Therefore, the first arm 40 is rotated, such that the shaft 30 to which one end of the first arm 40 is fixed is rotated, thereby opening or closing the door body 200. During the above-mentioned operation, the rotation transferring member 60 applying the rotational force to the first arm 40 moves along the slot 51 of the second arm 50 while being rotated based on the shaft 30. Therefore, the distance between a point, at which the rotation transferring member 60 applies to the rotational force to the first arm 40, and the center of an axis of the shaft 30 is shorter than the distance between a point, at which the gas lift 110 applies the rotational force to the arm link 130, and the center of an axis of the shaft 120 in the related art (which may be equivalent to the distance between a connection point between the gas lift 10 and the second arm 50 and the center of an axis of the shaft 30 according to an embodiment of the present inventive concept). As a result, since the shaft 30 may be rotated with a force smaller as compared with the related art, even though the gas lift 10 having a smaller capacity as compared with the related art is used, the same rotational force as that of the related art may be obtained.

In addition, even in the case of rotating the shaft 30 in a clockwise direction in order to close the door body 200 in the state in which the door body is opened as shown in FIG. 4C, since the distance between a point, at which the rotation transferring member 60 applies rotational force to the first arm 40, and the center of an axis of the shaft 30 is shorter than the distance between a point, at which the gas lift 110 applies the rotational force to the arm link 130, and the center of an axis of the shaft 120 in the related art (which may be equivalent to the distance between a connection point between the gas lift 10 and the second arm 50 and the center of an axis of the shaft 30 according to an embodiment of the present inventive concept), the door body 200 may be closed with a smaller force as compared with the related art.

As described above, the rotation transferring member 60 transferring the force to the shaft 30 moves along the second guide groove 41 of the first arm 40 in the length direction of the first arm 40 while being locked in and guided by the first guide groove 22 of the guide cams 20 in order to perform the opening operation or the closing operation of the door body 200, thereby making it possible to make the distance between the point, at which the rotation transferring member 60 applies the rotational force to the first arm 40, and the center of an axis of the shaft 30 shorter than the distance between the point, at which the gas lift 10 transfers the force, and the center of an axis of the shaft 30. As a result, since the opening operation and the closing operation of the door body 200 may be performed with a smaller force, the capacity of the gas lift 10 may be decreased.

In addition, the first guide groove 22 of the guide cams 20 guiding movement of the rotation transferring member 60 has a 'U' shape or a position of the rotation transferring member 60 in the state in which the door body 200 is closed and the state in which the door body 200 is opened is closer to the center of an axis of the shaft 30 as compared with a position of the rotation transferring member 60 in the state of performing the closing or opening operation of the door body 200. Therefore, the user may start the opening operation or the closing operation of the door body 200 with a small force.

Hereinabove, although a few exemplary embodiments of the present inventive concept have been shown and described, the present inventive concept is not limited to the described exemplary embodiments. Instead, it would be appreciated by those skilled in the art that changes may be made to these exemplary embodiments without departing from the principles and spirit of the inventive concept, the scope of which is defined by the appended claims and their equivalents.

For example, although the case in which the second arm 50 according to an embodiment of the present inventive concept is positioned between the first arm 40 and the guide cams 20 has been described, the first arm 40 may also be positioned between the second arm 50 and the guide cams 20. In this case, the first arm 40 may have a shape having the second guide groove 41 penetrating therethrough. This configuration may have the same acting effect as the aforementioned configurations of an embodiment of the present inventive concept.

With the above-mentioned configuration, the rotation transferring member transferring the force to the shaft transfers the rotational force to the first arm while moving in the length direction of the second arm simultaneously with being locked in and guided by the first guide groove of the guide cam in order to perform the opening operation or the closing operation of the door body, thereby making it possible to make the distance between the point, at which the rotation transferring member applies the rotational force to the first arm, and the center of an axis of the shaft, shorter than the distance between the point, at which the gas lift transfers the force, and the center of an axis of the shaft. As a result, since the opening operation and the closing operation of the door body may be performed with a smaller force, the capacity of the gas lift may be decreased.

What is claimed is:

1. A flap door for a vehicle, comprising:
    a door body configured to be rotated around a longitudinal axis of a shaft by extension of a gas lift the gas lift is movable in a length direction thereof to move the door body to open or close a predetermined space provided in the vehicle;
    a guide cam fixed to a sidewall, the shaft rotatably mounted to the guide cam at a center of the guide cam such that the longitudinal axis of the shaft is perpendicular to the sidewall, and the guide cam having a guide groove formed in a side of the guide cam;
    a first arm having one end thereof fixed to the shaft and having the other end thereof extending toward the gas lift;
    a second arm having one end thereof connected to the shaft so as to be rotatable with respect to the shaft and having the other end thereof rotatably connected to one end of the gas lift; and having
    a rotation transferring member movably mounted in the guide groove of the guide cam and transferring a rotational force of the second arm to the first arm and shaft, as the rotation transferring member simultaneously moves along a slot formed in a length direction of the second arm and along the guide groove according to rotation of the second arm.

2. The flap door for a vehicle according to claim 1, wherein the first arm includes a guide groove formed therein in a length direction of the first arm, and the rotation transferring member is movably mounted in the guide groove of the guide cam, the guide groove of the first arm, and the slot of the second arm.

3. The flap door for a vehicle according to claim 1, wherein the guide groove of the guide cam is generally U-shaped.

4. The flap door for a vehicle according to claim 1, wherein, the rotation transferring member is closer to the shaft when the door body is in a closed position and when the door body is in a opened position than when the door body is in at least one position between the opened and closed positions.

5. The flap door for a vehicle according to claim 1, wherein the second arm is positioned between the guide cam and the first arm.

* * * * *